United States Patent [19]
Fierle et al.

[11] Patent Number: 6,068,045
[45] Date of Patent: May 30, 2000

[54] ROTOR CONSTRUCTION FOR AIR PREHEATER

[75] Inventors: Kurt M. Fierle; Kevin J. O'Boyle, both of Wellsville, N.Y.

[73] Assignee: ABB Air Preheater, Inc., Wellsville, N.Y.

[21] Appl. No.: 09/383,464

[22] Filed: Aug. 26, 1999

[51] Int. Cl.[7] .................................................. F23L 15/02
[52] U.S. Cl. ...................................... 165/8; 165/10
[58] Field of Search ............................ 165/4, 6, 8, 9, 165/10

[56] References Cited

U.S. PATENT DOCUMENTS 5,664,620  9/1997  Ritter .......................................... 165/8
5,826,642  10/1998  Brophy ....................................... 165/8
5,836,378  11/1998  Brophy et al. ............................. 165/8

*Primary Examiner*—Christopher Atkinson
*Attorney, Agent, or Firm*—Alix, Yale & Ristas, LLP

[57] ABSTRACT

The support grating system for the heat exchange baskets of a rotary regenerative air preheater is arranged to be able to make full use of the rotor volume for the heat absorbent material. Support gratings can be located inside of the volume of the rotor enclosed by the pin rack assembly and baskets can still be loaded. This is accomplished by installing certain of the support gratings or portions thereof after the baskets have been loaded into position in the basket layer inside of the pin rack assembly.

5 Claims, 5 Drawing Sheets

6,068,045

ROTOR CONSTRUCTION FOR AIR PREHEATER

BACKGROUND OF THE INVENTION

The present invention relates to rotary regenerative heat exchangers generally used as air preheaters and more specifically to an improved rotor construction which maximizes the space within the rotor occupied by heat absorbent material.

A rotary regenerative heat exchanger is employed to transfer heat from one hot gas stream, such as a hot flue gas stream, to another cold gas stream, such as combustion air. The rotor contains a mass of heat absorbent material which first rotates through a passageway for the hot gas steam where heat is absorbed by the heat absorbent material. As the rotor continues to turn, the heated absorbent material enters the passageway for the cold gas stream where the heat is transferred from the absorbent material to the cold gas stream.

In a typical rotary heat exchanger, such a rotary regenerative air preheater, the cylindrical rotor is disposed on a vertical central rotor post and divided into a plurality of sector-shaped compartments by a plurality of radial partitions, referred to as diaphragms, extending from the rotor post to the outer peripheral shell of the rotor. These sector-shaped compartments are loaded with modular heat exchange baskets which contain the mass of heat absorbent material commonly formed of stacked plate-like elements.

In one type of rotary heat exchanger, support gratings extend between the diaphragms and form open supports on which the baskets are supported. The baskets are loaded into the sectors radially through the rotor shell. See for example U.S. Pat. No. 5,615,732.

For the rotation of the rotor, a pin rack assembly is mounted on the periphery of the rotor. This assembly constitutes a series of pins which are engaged by a drive gear to cause rotation. See for example U.S. Pat. Nos. 3,216,486 and 5,803,157. The presence of the pin rack assembly around the periphery of the rotor shell, usually on the cold end of the rotor, limits the access to that portion of the rotor through the rotor shell for purposes of radially loading the baskets into the rotor. It is typical that the lowermost (cold end) support grating is located above the pin rack assembly. This creates a volume at the bottom of the rotor which is void of heat absorbent material and which is essentially wasted space. This can be as great as a foot or more of rotor height thereby requiring a rotor and overall structure which are larger than necessary for the amount of heat absorbent material.

SUMMARY OF THE INVENTION

The present invention relates to the structure of the rotor for a rotary regenerative heat exchanger and more specifically to the structure of the support grating system and the way that the baskets are loaded to make full use of the rotor volume for heat absorbent material. The invention provides an arrangement whereby support grating means can be located inside the volume of the rotor enclosed by the pin rack assembly and whereby baskets can still be loaded. More particularly, the support grating system includes gratings or portions of gratings which are installed after loading the baskets into position in the basket layer inside of the pin rack assembly.

DESCRIPTION OF THE PREFERRED EMBODIMENT

Figure 1:
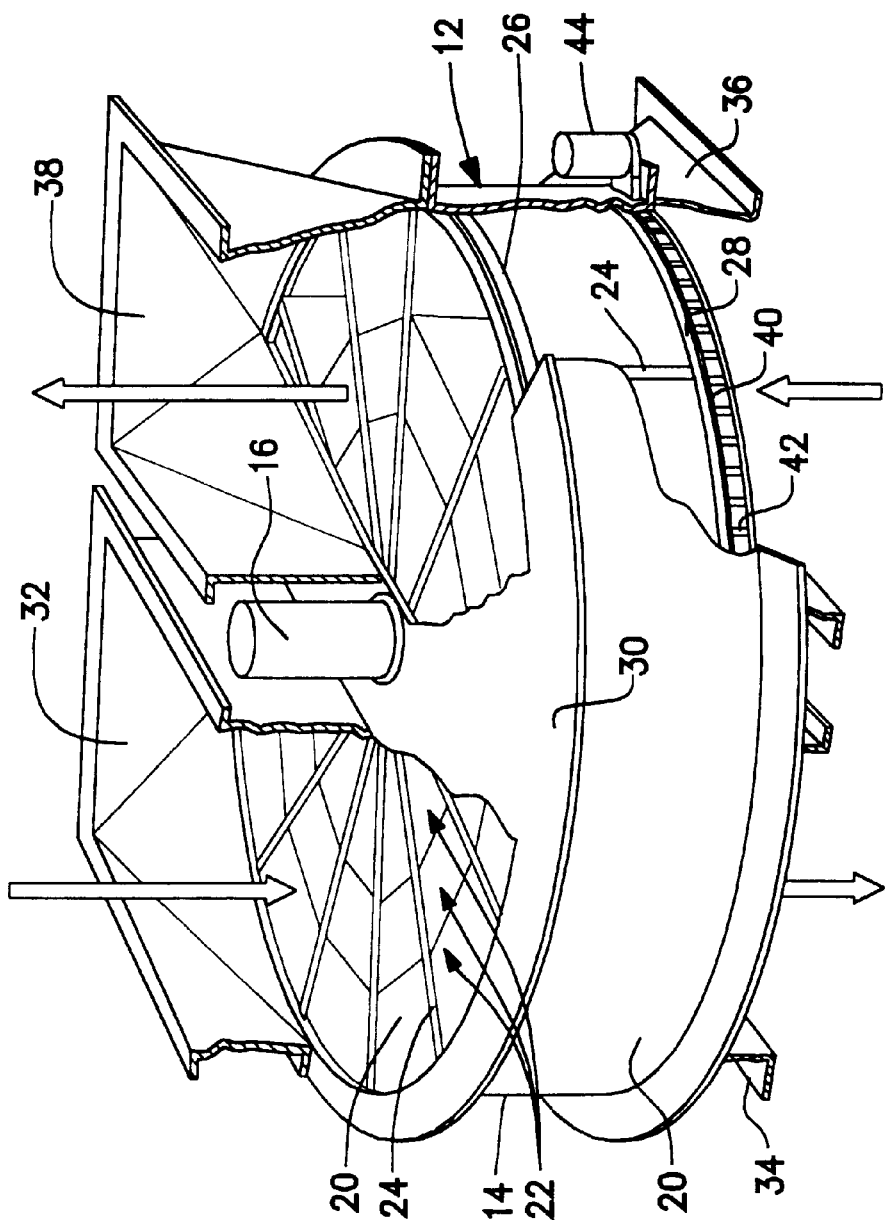
FIG. 1 is a general perspective view of a conventional rotary regenerative air preheater showing a pin rack assembly and rotor drive means.

FIG. 1 of the drawings is a partially cut-away perspective view of a typical air heater showing a housing 12 in which the rotor 14 is mounted on the shaft or post 16 for rotation. The rotor is composed of a plurality of sectors 20 with each sector containing a number of basket modules 22 and with each sector being defined by the diaphragms 24. The diaphragms are attached at their outer ends to the hot end rotor shell section 26 and the cold end rotor shell section 28. The basket modules contain the heat absorbent material usually in the form of closely spaced heat exchange plates. The housing is divided by means of the flow impervious sector plate 30 into a flue gas side and an air side. A corresponding sector plate is also located on the bottom of the unit. The hot flue gases enter the air heater through the gas inlet duct 32, flow through the rotor where heat is transferred to the heat absorbent material in the rotor and then exit through gas outlet duct 34. The countercurrent flowing air enters through air inlet duct 36, flows through the rotor where it picks up heat and then exits through air outlet duct 38. Attached to the cold end rotor shell section 28 at the bottom cold end of the rotor is the pin rack assembly 40 containing the pins 42 which are engaged by the drive pinion (not shown) of the drive motor 44.

Figure 2:
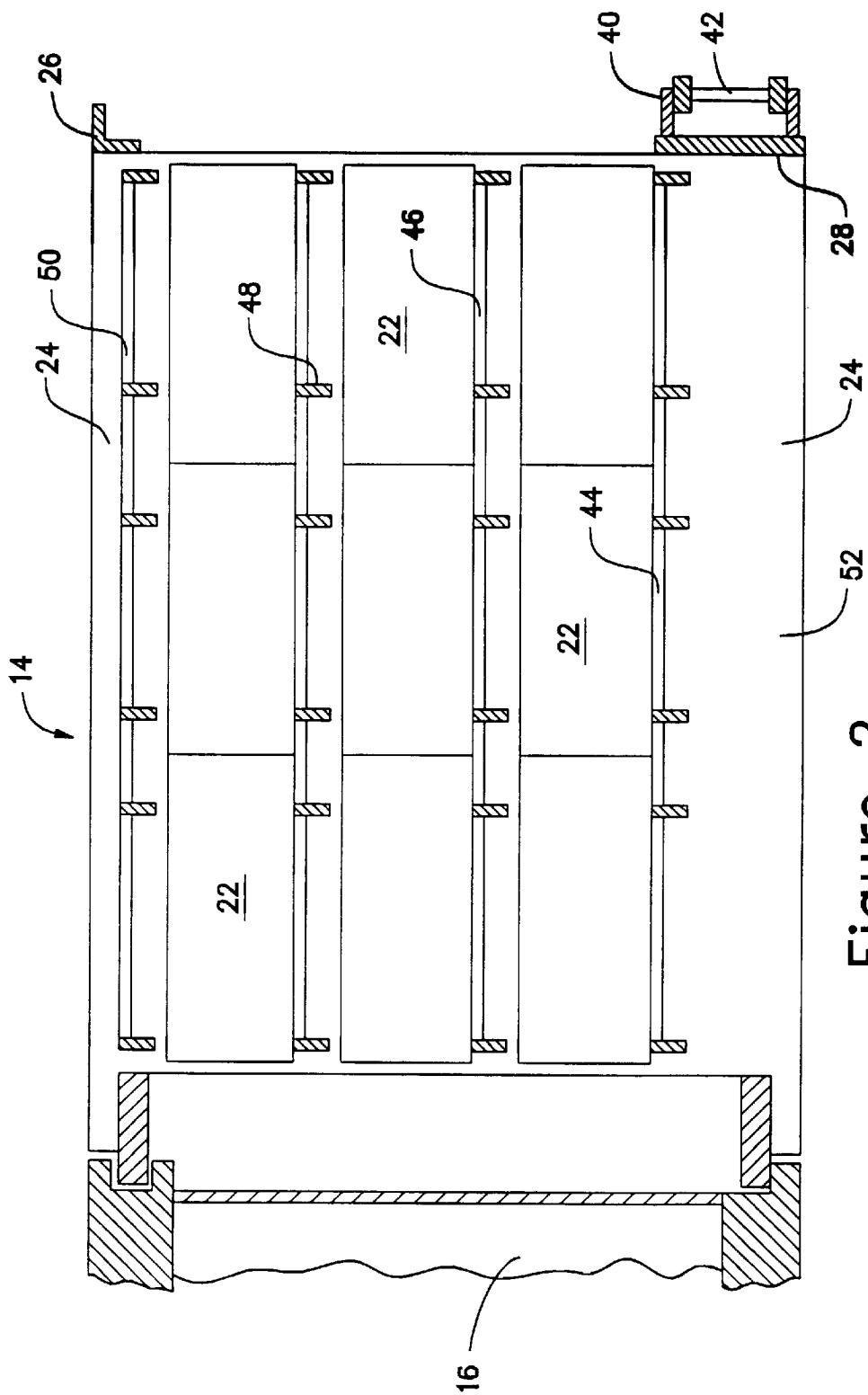
FIG. 2 is a cross section of a portion of a rotor according to the prior art.

FIG. 2 is a cross section of a portion of a typical prior art rotor 14 showing the post 16, a diaphragm 24, the hot end rotor shell section 26, the cold end rotor shell section 28 and the pin rack assembly 40 with the pins 42. Also shown is the conventional arrangement of support gratings 44, 46 and 48 plus the top grating 50 which provides structural support between the top edges of the diaphragms. These support gratings are attached by welding to and between the diaphragms 24. As can be seen in this FIG. 2, the bottom support grating 44 is located and attached above the pin rack assembly 40 and the cold end rotor shell section 28 so that the baskets 22 can be loaded radially onto the support grating 44 without interference by the cold end rotor shell section 28 and the pin rack assembly 40. As can also be seen in this FIG. 2, the volume of the rotor 52 surrounded by the cold end rotor shell section 28 and the pin rack assembly 40 is void of baskets and is wasted space.

Figure 3:
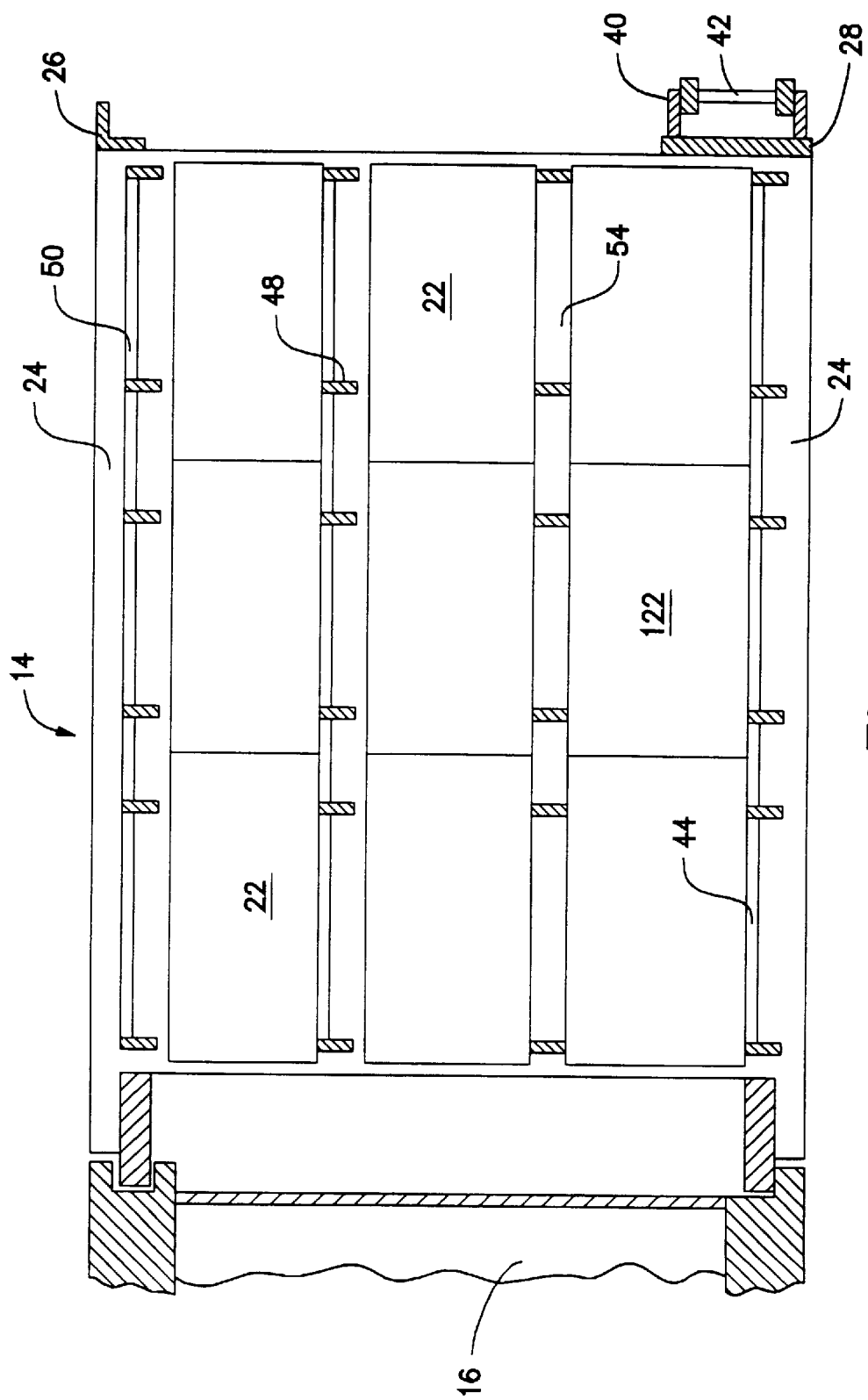
FIG. 3 is a cross section of a portion of a rotor similar to FIG. 2 but incorporating one embodiment of the invention.

The first embodiment of the invention is illustrated in FIG. 3 in which it can be seen that the lower support grating 44 has been moved down to a position more directly adjacent to the bottom cold end of the rotor and within the volume of the rotor surrounded by the cold end rotor shell section 28 and the pin rack assembly 40. As a practical matter, it is not moved all the way to the bottom edge of the diaphragm so that there is no chance of interfering with the conventional cold end radial seals (not shown). However, most of the previously wasted space 52 no longer exists.

In order to facilitate the loading of the baskets now designated 122 onto the relocated support grating 44, the support grating 46 is omitted. Instead, there is now an unattached, removable spacer grating 54. The remaining gratings 44, 48 and 50 are fixed as in the prior art shown in FIG. 2. To load the support grating 44, the spacer grating 54 is removed or left out. The baskets 122 are then loaded radially and lowered down onto the support grating 44. Once loaded, the spacer grating 54 is inserted radially so that it rests on the top of the baskets 122 sitting on the support grating 44. The next level of baskets 22 are then loaded onto the spacer grating 54. Since the spacer grating 54 need not be welded into place, the support grating 44 is designed to bear the weight of the two levels of baskets 22 and 122 as well as the spacer grating 54. The remaining baskets are then installed in the conventional manner onto the support grating 48. To unload the baskets, the reverse procedure is followed. The baskets 22 are first removed and then the spacer grid 54 and baskets 122 are removed. It should be mentioned that, although only three levels of baskets have been illustrated, there could be any desired number of levels within the scope of the invention. Likewise, although only three baskets have been illustrated on each level, there could be more or even less.

Figure 4:
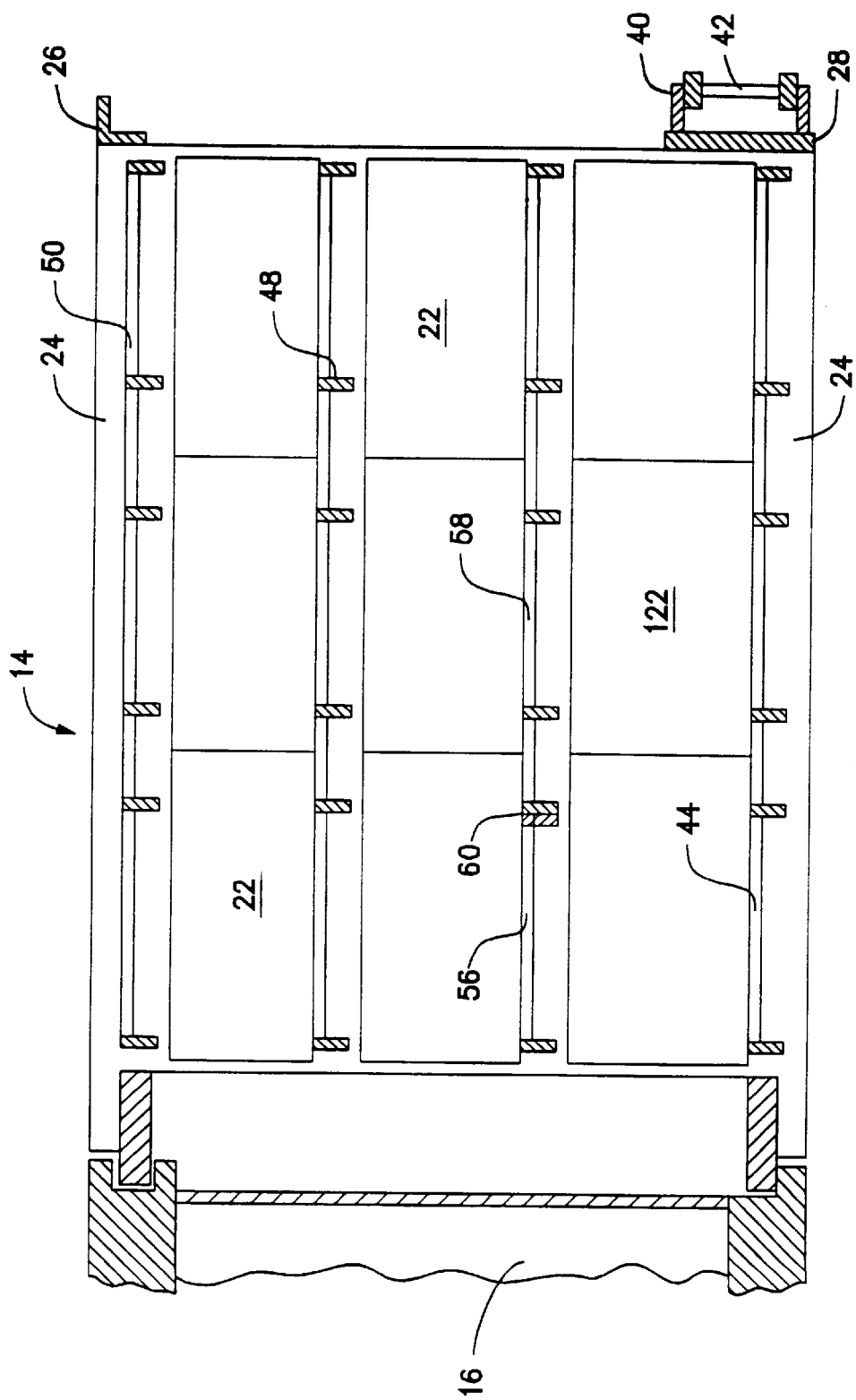
FIGS. 4 and 5 are further cross sections illustrating additional embodiments of the invention.

FIG. 4 illustrates another embodiment of the invention wherein the lower support grating 44 is again moved down to a position more directly adjacent to the bottom cold end of the rotor. In this embodiment, instead of the removable spacer grating 54, there is a support grating made up of two separate sections, an inner section 56 and an outer section 58 meeting at 60. The inner section 56 is permanently welded into place between the diaphragms 24 just as with the support grating 44, 48 and 50. The cold end baskets 122 are loaded with the grating section 58 removed in the same way that the baskets 122 are loaded in the FIG. 3 embodiment. After the cold end baskets 122 have been loaded onto the support grating 44, the outer section 58 of the support grating is installed and welded into place adjacent to the inner section 56. The baskets 22 are then loaded radially onto the support grating sections 56 and 58. The relative sizes of the sections 56 and 58 shown in FIG. 4 may be changed as desired as long as the size of the section 58 is large enough to load the baskets 122.

Figure 5:
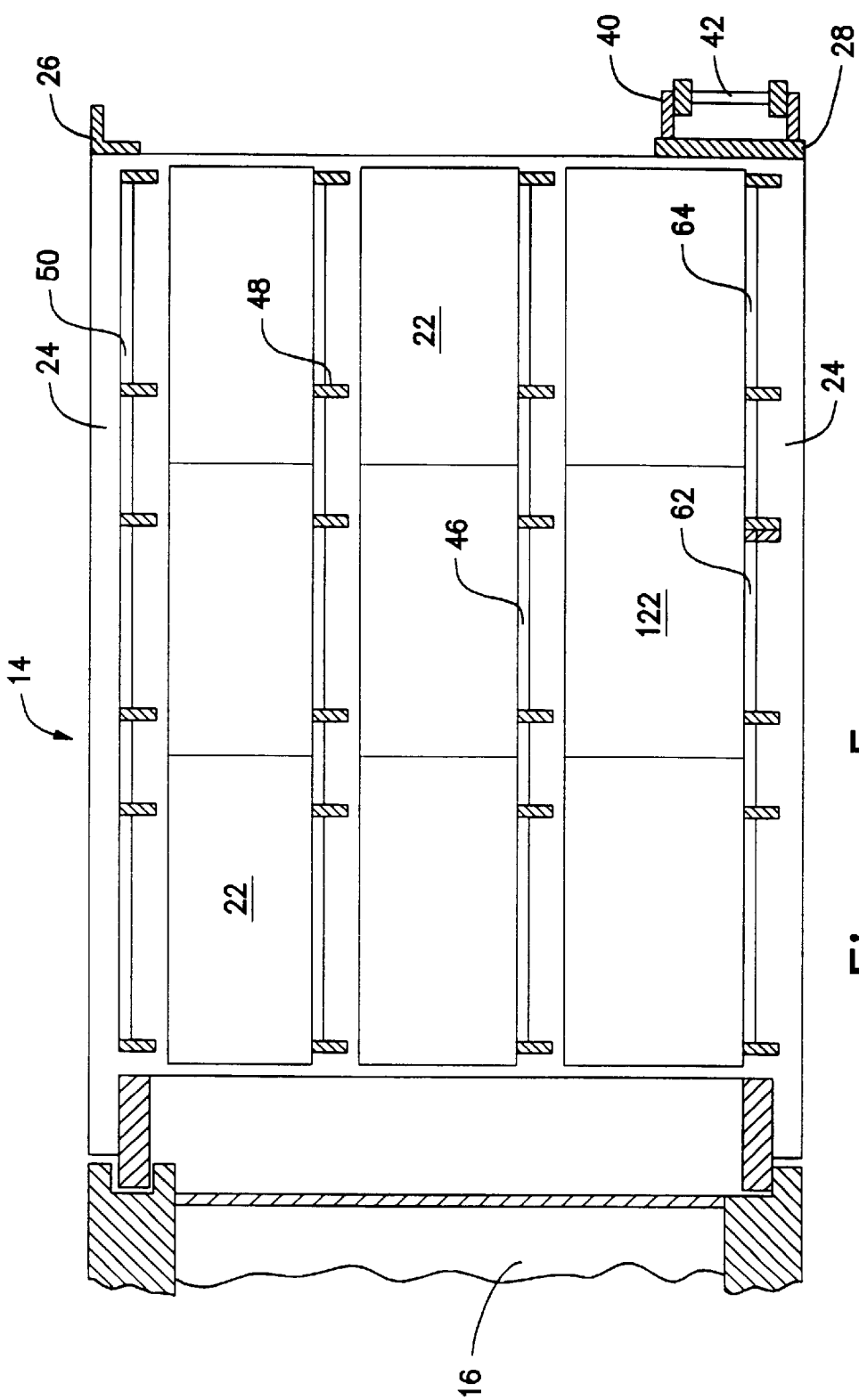

The third embodiment of the invention is shown in FIG. 5. In this FIG. 5 embodiment, the support grating 46 such as shown in FIG. 2 remains in place. However, instead of merely moving the support grating 44 down as in FIG. 3, the support grating 44 is replaced with a two-section grating comprising inner section 62 and outer section 64. The inner section 62 is permanently welded in place just as with the inner section 56 of the FIG. 4 embodiment. The cold end baskets 122 are loaded from the bottom with the outer section 64 removed. The baskets 122 are lifted into position and pushed towards the inside of the rotor. After the outermost cold end basket 122 is lifted into position and held in place, the outer section 64 of the support grating is placed into position and welded. The balance of the rotor is loaded in the conventional manner.

What is claimed is:

1. In a rotor of a rotary regenerative heat exchanger having a plurality of diaphragms dividing the rotor into a plurality of sector shaped compartments and having a pin rack assembly extending around the periphery of the lower cold end of said rotor and enclosing a volume of said rotor within said pin rack assembly and further having a plurality of support gratings in each sector extending between said diagrams for supporting heat exchange baskets, the improvement comprising:

a. at least one upper support grating within each sector located above said enclosed volume of said rotor and fixed between said diaphragms for supporting upper heat exchange baskets installed radially through the periphery of said rotor;

b. a bottom support grating within each sector located at the lower cold end of each sector within said enclosed volume of said rotor and fixed between said diaphragms for supporting bottom heat exchange baskets; and c. an intermediate support grating within each sector located above said enclosed volume of said rotor and below said upper support grating for supporting intermediate heat exchange baskets, said intermediate support grating being at least partially removable for installing said bottom heat exchange baskets radially through the periphery of said rotor and down onto said bottom support grating when said intermediate support grating is at least partially removed.

2. In a rotor of a rotary regenerative heat exchanger as recited in claim 1 wherein said intermediate support grating is fully removable and wherein said intermediate support grating is adapted to be supported by said bottom heat exchange baskets supported on said bottom support grating without attachment to said diaphragms.

3. In a rotor of a rotary regenerative heat exchanger as recited in claim 1 wherein said intermediate support grating has an inner portion which is fixed to said diaphragms and an outer portion which is removable for installation of said bottom heat exchange baskets and which is adapted to be attached to said diaphragms after installation of said bottom heat exchange baskets.

4. In a rotor of a rotary regenerative heat exchanger having a plurality of diaphragms dividing the rotor into a plurality of sector shaped compartments and having a pin rack assembly extending around the periphery of the lower cold end of said rotor and enclosing a volume of said rotor within said pin rack assembly and further having a plurality of support gratings in each sector extending between said diagrams for supporting heat exchange baskets, the improvement comprising:

a. at least one upper support grating within each sector located above said enclosed volume of said rotor and fixed between said diaphragms for supporting upper heat exchange baskets installed radially through the periphery of said rotor;

b. a bottom support grating within each sector located at the lower cold end of each sector within said enclosed volume of said rotor for supporting bottom heat exchange baskets; and c. an intermediate support grating within each sector located above said enclosed volume of said rotor and below said upper support grating for supporting intermediate heat exchange baskets; and wherein at least a portion of one of said bottom support grating and said intermediate support grating is removable for installing said bottom heat exchange baskets onto said bottom support grating.

5. In a rotor of a rotary regenerative heat exchanger as recited in claim 4 wherein said intermediate support grating is fixed to said diaphragms and said bottom support grating has an inner portion which is fixed to said diaphragms and an outer portion which is removable for installation of said bottom heat exchange baskets and which is adapted to be attached to said diaphragms after installation of said bottom heat exchange baskets.

* * * * *